(12) United States Patent
Hong et al.

(10) Patent No.: US 12,352,629 B2
(45) Date of Patent: Jul. 8, 2025

(54) BOLOMETER AND MANUFACTURING METHOD OF TEMPERATURE SENSING UNIT

(71) Applicants: HON HAI PRECISION INDUSTRY CO., LTD., New Taipei (TW); Hon Young Semiconductor Corporation, Hsinchu (TW)

(72) Inventors: Kuo-Bin Hong, New Taipei (TW); Shang-Yu Chuang, Hsinchu (TW); Kuang-Hao Chiang, Hsinchu (TW); Hao-Chung Kuo, New Taipei (TW)

(73) Assignees: HON HAI PRECISION INDUSTRY CO., LTD., New Taipei (TW); Hon Young Semiconductor Corporation, Hsinchu (TW)

( * ) Notice: Subject to any disclaimer, the term of this patent is extended or adjusted under 35 U.S.C. 154(b) by 205 days.

(21) Appl. No.: 18/461,531

(22) Filed: Sep. 6, 2023

(65) Prior Publication Data

US 2024/0077362 A1 Mar. 7, 2024

(30) Foreign Application Priority Data

Sep. 7, 2022 (TW) ................................. 111133932

(51) Int. Cl.
*G01J 5/08* (2022.01)
*G01J 5/02* (2022.01)
(Continued)

(52) U.S. Cl.
CPC ............. *G01J 5/0853* (2013.01); *G01J 5/024* (2013.01); *G01J 5/0813* (2022.01); *G01J 5/20* (2013.01); *G01J 5/023* (2013.01)

(58) Field of Classification Search
CPC .......... G01J 5/023; G01J 5/024; G01J 5/0813; G01J 5/0853; G01J 5/20
See application file for complete search history.

(56) References Cited

U.S. PATENT DOCUMENTS

2018/0374981 A1   12/2018   Carr

FOREIGN PATENT DOCUMENTS

| CN | 107741278 A | 2/2018 |
|---|---|---|
| CN | 106115604 B | 9/2018 |

(Continued)

OTHER PUBLICATIONS

Maier, Thomas et al., "Wavelength-tunable microbolometers with metamaterial absorbers," Opt. Lett. 34, 3012-3014 (2009). (Year: 2009).*

*Primary Examiner* — Mark R Gaworecki
(74) *Attorney, Agent, or Firm* — CKC & Partners Co., LLC

(57) ABSTRACT

The present disclosure provides a bolometer including a substrate, a reflecting mirror on the substrate, and a temperature sensing unit above the reflecting mirror. The temperature sensing unit includes a first insulating layer, a thermistor on the first insulating layer, a second insulating layer on the thermistor, an electrode layer in the second insulating layer and right above the thermistor, and a metal meta-surface in the second insulating layer and right above the electrode layer. The electrode layer includes a plurality of electrodes separated from each other. A projection region of the metal meta-surface on the thermistor is equal to or larger than the thermistor.

20 Claims, 15 Drawing Sheets

(51) Int. Cl.
*G01J 5/0813* (2022.01)
*G01J 5/20* (2006.01)

(56) References Cited

FOREIGN PATENT DOCUMENTS

| | | |
|---|---|---|
| CN | 109813446 A | 5/2019 |
| CN | 109282903 B | 11/2020 |
| CN | 110307905 B | 3/2021 |
| CN | 113551783 A | 10/2021 |
| CN | 113720472 A | 11/2021 |
| CN | 114051658 A | 2/2022 |
| CN | 114964513 A | 8/2022 |
| JP | 6046630 B2 | 12/2016 |
| WO | WO-2019043299 A1 * | 3/2019 ........... B81B 7/0067 |

* cited by examiner

BOLOMETER AND MANUFACTURING METHOD OF TEMPERATURE SENSING UNIT

CROSS-REFERENCE TO RELATED APPLICATION

This application claims priority to Taiwan Application Serial Number 111133932, filed Sep. 7, 2022, which is herein incorporated by reference in its entirety.

BACKGROUND

Field of Invention

The present disclosure relates to the bolometer. More particularly, the present disclosure relates to the temperature sensing unit in the bolometer and the manufacturing method thereof.

Description of Related Art

A bolometer converts the infrared light emitted by a sample to the electronic signal, thereby determining the temperature of the sample. For example, the bolometer may absorb the infrared light after the sample emits the infrared light. As a result, the temperature of the thermistor in the bolometer rises, which changes the resistance value of the thermistor. Since the resistance value of the thermistor changes, the current in the bolometer correspondingly changes such that the circuit element determines the temperature of the sample. However, the infrared response bandwidth and the temperature rising speed of the bolometer may influence the accuracy of the bolometer. Therefore, the absorption efficiency of specific wavelength by the bolometer needs to be increased to improve the accuracy of the bolometer and the performance of the bolometer.

SUMMARY

According to some embodiments of the present disclosure, a bolometer includes a substrate, a reflecting mirror on the substrate, and a temperature sensing unit above the reflecting mirror. The temperature sensing unit includes a first insulating layer, a thermistor on the first insulating layer, a second insulating layer on the thermistor, an electrode layer in the second insulating layer and right above the thermistor, and a metal meta-surface in the second insulating layer and right above the electrode layer. The electrode layer includes a plurality of electrodes separated from each other. A projection region of the metal meta-surface on the thermistor is equal to or larger than the thermistor.

In some embodiments, a thickness of the metal meta-surface is between 5 nm and 20 nm.

In some embodiments, meta-atom unit cells of the metal meta-surface include cross-shaped unit cells or X-shaped unit cells.

In some embodiments, meta-atom unit cells of the metal meta-surface are arranged as a triangular crystal lattice or a tetragonal crystal lattice.

In some embodiments, the metal meta-surface is physically and electrically isolated from the electrode layer by the second insulating layer.

In some embodiments, the electrodes of the electrode layer include a first electrode group and a second electrode group. The first electrode group is adjacent to the second electrode group, and a plurality of first electrodes of the first electrode group is separated from a plurality of second electrodes of the second electrode group.

In some embodiments, the electrodes of the electrode layer include a first electrode group and a second electrode group. A plurality of first electrodes of the first electrode group and a plurality of second electrodes of the second electrode group are alternately arranged, and the first electrodes are separated from the second electrodes.

In some embodiments, the second insulating layer fills gaps between the electrodes of the electrode layer.

In some embodiments, the temperature sensing unit is physically isolated from the reflecting mirror.

In some embodiments, the bolometer further includes a plurality of supporting pillars on the substrate, and the supporting pillars separate the temperature sensing unit form the reflecting mirror.

In some embodiments, the bolometer further includes a plurality of supporting arms connecting the temperature sensing unit and the supporting pillars.

In some embodiments, the electrode layer is electrically connected to the thermistor by conductive anchors on the supporting arms.

In some embodiments, a gap filled with air is between the temperature sensing unit and the reflecting mirror.

In some embodiments, the reflecting mirror includes a multilayer structure formed of titanium, titanium nitride, or aluminum.

According to some embodiments of the present disclosure, a manufacturing method of a temperature sensing unit includes the following steps. A thermistor is formed on a first insulating layer. A first portion of a second insulating layer is formed on the thermistor, where the first portion covers the thermistor. An electrode layer is formed on the first portion. The electrode layer is right above the thermistor, and the first portion is exposed between multiple electrodes of the electrode layer. A second portion of the second insulating layer is formed on the electrode layer, where the second portion covers the electrode layer and the first portion. A metal meta-surface is formed on the second portion, where the metal meta-surface is right above the thermistor. A third portion of the second insulating layer is formed on the metal meta-surface, where the third portion covers the metal meta-surface and the second portion.

In some embodiments, forming the metal meta-surface includes forming a plurality of meta-atom unit cells of the metal meta-surface by a duty cycle between 1.5% and 35%.

In some embodiments, the method further includes depositing an insulating material of the first insulating layer and performing a patterning process on the insulating material to form the first insulating layer and a supporting arm connected to the first insulating layer.

In some embodiments, forming the electrode layer on the first portion further includes forming an extended portion of the electrode layer on the supporting arm, where the extended portion is electrically connected to the thermistor.

In some embodiments, after forming the metal meta-surface on the second portion, the second portion is exposed between a plurality of meta-atom unit cells of the metal meta-surface.

In some embodiments, forming the metal meta-surface on the second portion and forming the third portion of the second insulating layer on the metal meta-surface are performed in a same cavity.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
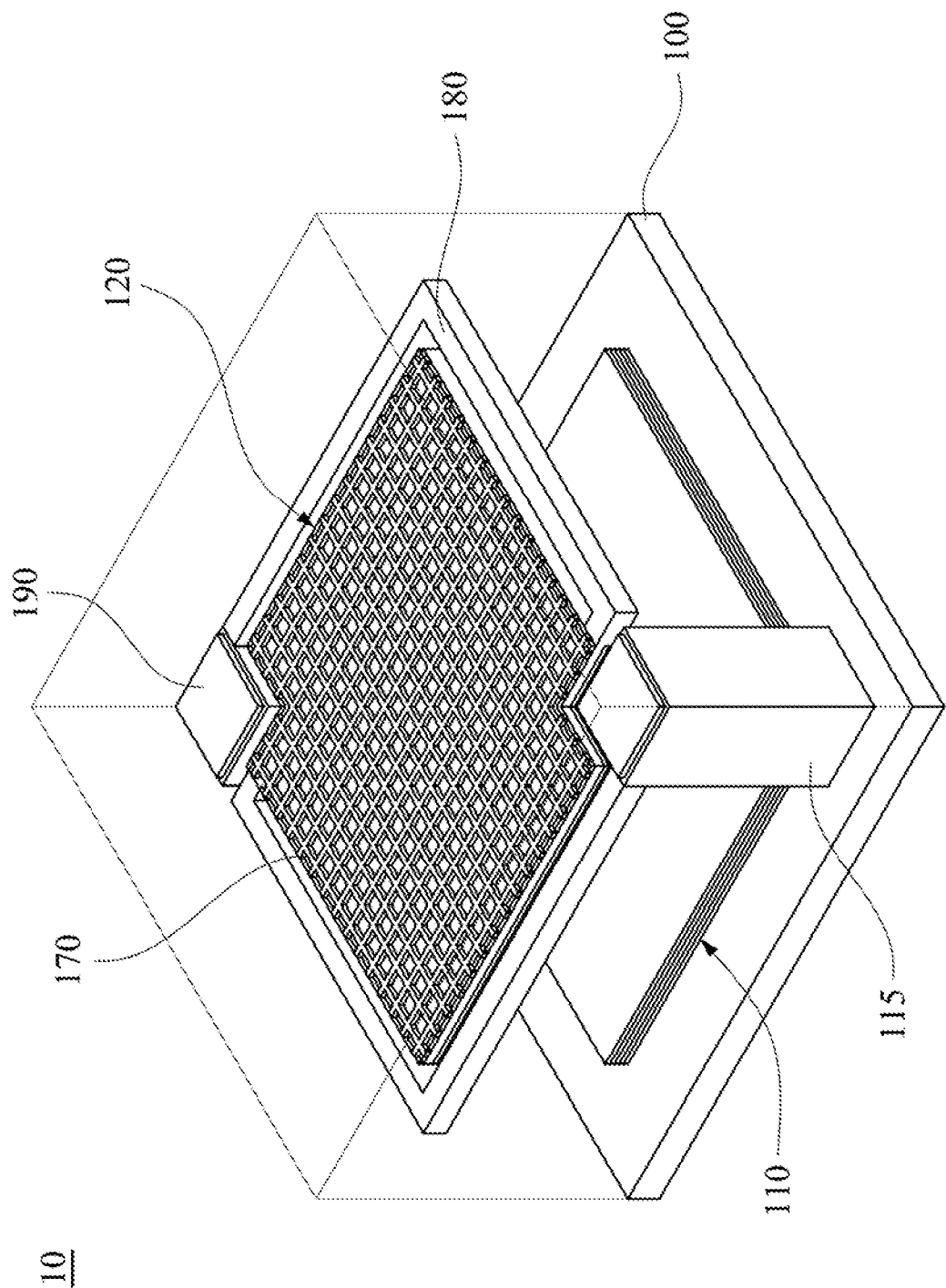
FIG. 1 illustrates a perspective view of a bolometer according to one embodiment of the present disclosure.

The following disclosure provides many different embodiments, or examples, for implementing different features of the provided subject matter. Specific examples of components, arrangements, etc., are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

The present disclosure provides a bolometer and a manufacturing method of a temperature sensing unit of the bolometer. The bolometer includes a temperature sensing unit above a reflecting mirror. The temperature sensing unit includes a thermistor, an electrode layer right above the thermistor, and a metal meta-surface right above the electrode layer. The metal meta-surface has high absorbance at specific wavelength, so that the infrared energy received by the bolometer may be easily transmitted to the thermistor to improve the sensitivity of the temperature sensing unit. Therefore, the metal meta-surface may increase the infrared absorption efficiency of the temperature sensing unit and provides the bolometer with high accuracy.

According to one embodiment of the present disclosure, FIG. 1 illustrates a perspective view of a bolometer 10. The bolometer 10 includes a substrate 100, a reflecting mirror 110 on the substrate 100, and a temperature sensing unit 120 above the reflecting mirror 110. After the temperature sensing unit 120 of the bolometer 10 receives the infrared light from a sample, the temperature sensing unit 120 converts the infrared light into the electronic signal and transmits the electronic signal to other elements by the circuit of the bolometer 10. This allows the bolometer 10 to determine the temperature of the sample from the infrared light.

Figures 2A, 2B:
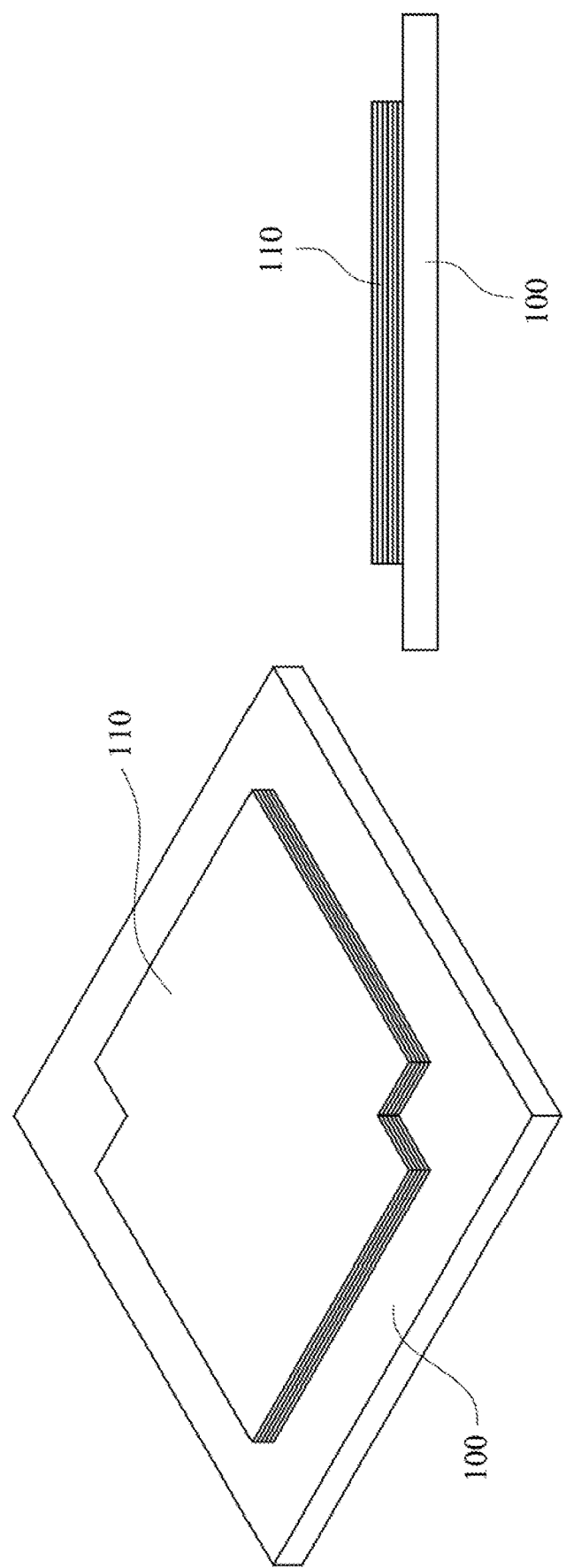
FIG. 2A illustrates a partial perspective view of the bolometer in FIG. 1.
FIG. 2B illustrates a cross-sectional view of the bolometer in FIG. 2A.

Specifically, the bolometer 10 may have a first portion including the substrate 100 with the reflecting mirror 110 and a second portion including the temperature sensing unit 120. FIG. 2A illustrates a perspective view of the first portion of the bolometer 10 in FIG. 1, and FIG. 2B illustrates a cross-sectional view of the first portion of the bolometer 10 in FIG. 2A. The substrate 100 acts as a carrier for the elements above. In some embodiments, the circuit elements, such as read-out integrated circuit (ROIC), of the bolometer 10 may be included in the substrate 100.

The reflecting mirror 110 is configured to reflect the infrared light emitted into the bolometer 10. Since the reflecting mirror 110 is positioned below the temperature sensing unit 120, the reflecting mirror 110 may reflect the infrared light toward the temperature sensing unit 120. As a result, the temperature sensing unit 120 may receive not only the infrared light toward the incident plane (i.e., the upper surface of the temperature sensing unit 120) but also the reflected infrared light from the reflecting mirror 110 toward the backside (i.e., the lower surface of the temperature sensing unit 120). In other words, the reflecting mirror 110 may increase the infrared energy received by the temperature sensing unit 120, thereby improving the sensitivity of the bolometer 10. In some embodiments, as shown in FIG. 2A and FIG. 2B, the reflecting mirror 110 may include a multilayer structure to show a high infrared reflectance. For example, the reflecting mirror 110 may include a multilayer formed of titanium, titanium nitride, aluminum, or the like.

Figure 3A:
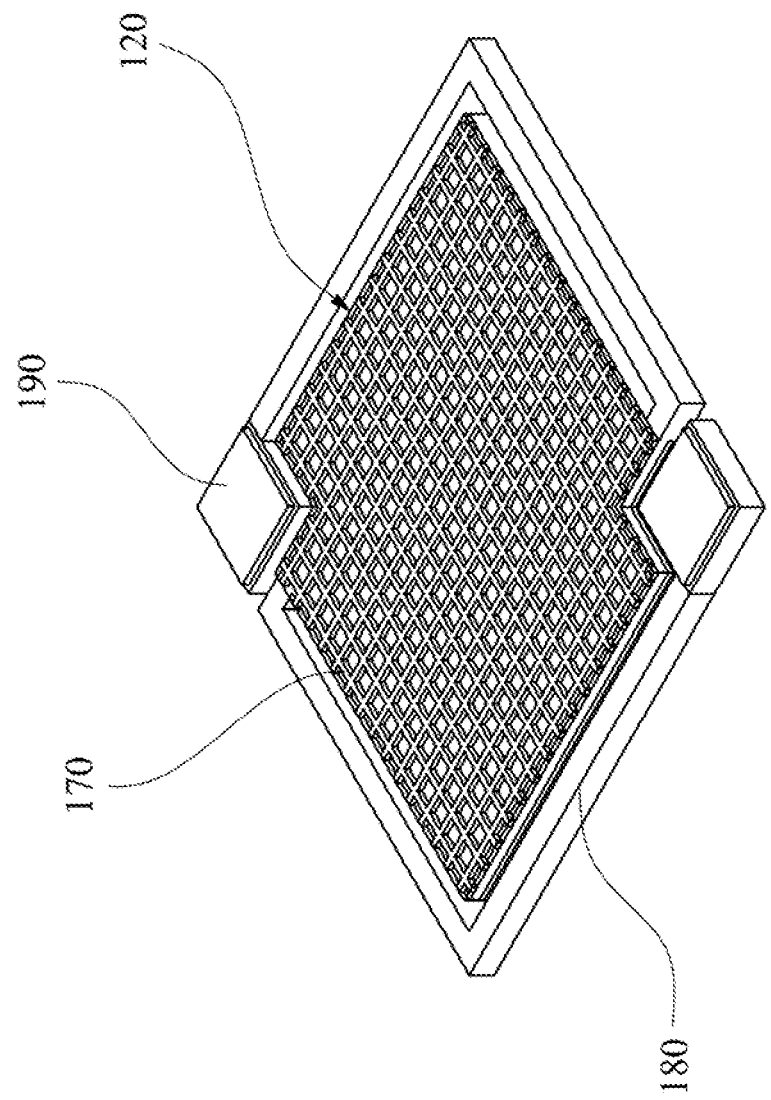
FIG. 3A illustrates a perspective view of the bolometer in FIG. 1.
Figure 3B:
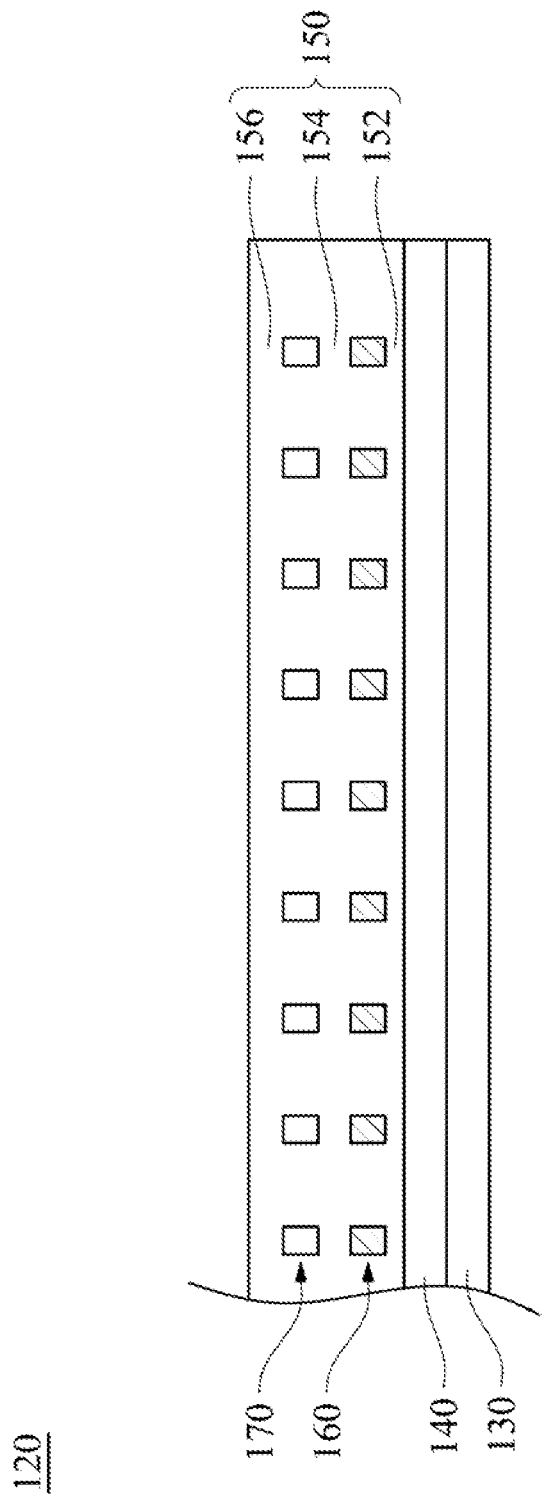
FIG. 3B illustrates a cross-sectional view of the bolometer in FIG. 3A.
Figure 3C:
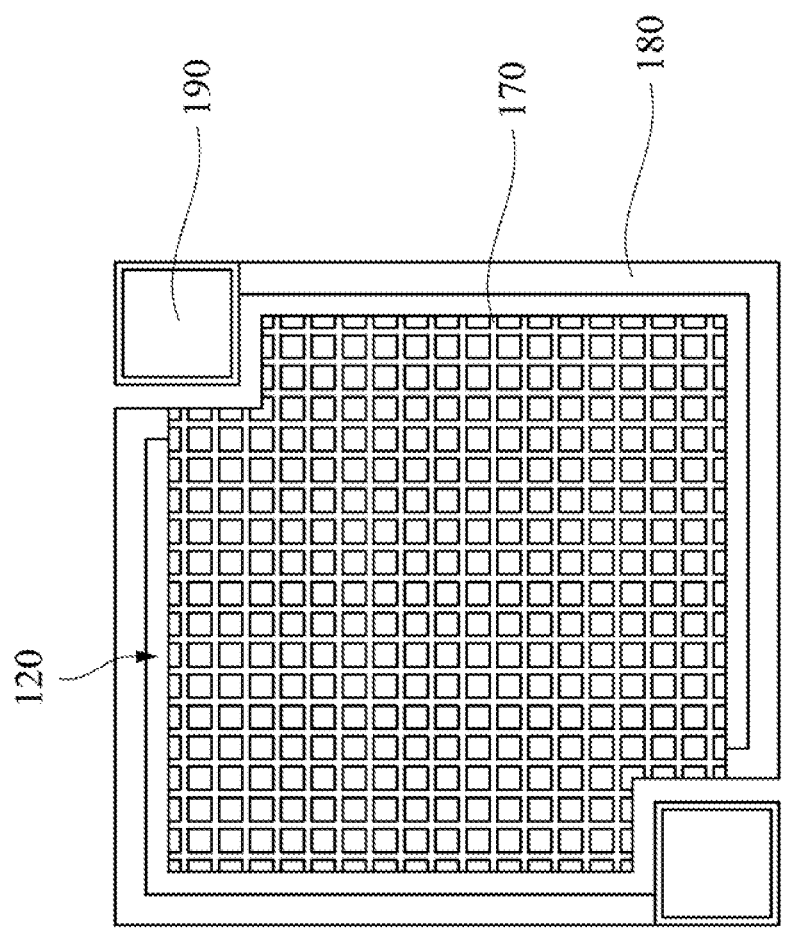
FIG. 3C illustrates a top view of the bolometer in FIG. 3A.

FIG. 3A illustrates a perspective view of the second portion of the bolometer 10 in FIG. 1. FIG. 3B illustrates a bolometer 10 of the second portion of the bolometer 10 in FIG. 3A, and FIG. 3C illustrates a top view of the second portion of the bolometer 10 in FIG. 3A. The temperature sensing unit 120 includes a first insulating layer 130, a thermistor 140 on the first insulating layer 130, a second insulating layer 150 on the thermistor 140, an electrode layer 160 in the second insulating layer 150, and a metal meta-surface 170 in the second insulating layer 150.

Specifically, after the temperature sensing unit 120 receives the infrared light, the temperature of the thermistor 140 rises and thus changes the resistance value of the thermistor 140. As a result, the current signal of the bolometer 10 may change after the current flows through the thermistor 140 of the bolometer 10. The temperature of the sample corresponding to the infrared light may be determined by the change of current in the bolometer 10. In some embodiments, the material of the thermistor 140 may include vanadium oxide, such as VO, $V_2O_3$, $VO_2$, or the like.

The first insulating layer 130 acts as the carrier of the thermistor 140, so that thermistor 140 may not physically contact the underlying reflecting mirror 110. The second insulating layer 150 is used to protect and isolate the thermistor 140 from the elements above. In other words, the first insulating layer 130 and the second insulating layer 150 protect the surface of the thermistor 140, which reduces the damage to the surface of the thermistor 140 and the impact on the resistance value of the thermistor 140.

The first insulating layer 130 and the second insulating layer 150 may have high infrared absorbance, which conduces to the infrared absorption of the temperature sensing unit 120. Specifically, the infrared light emitted into the temperature sensing unit 120 may first be absorbed by the first insulating layer 130 and the second insulating layer 150. Then, the energy absorbed by the first insulating layer 130 and the second insulating layer 150 is transmitted to the thermistor 140 to raise the temperature of the thermistor 140. In some embodiments, the material of the first insulating layer 130 and the second insulating layer 150 may include silicon nitride, silicon dioxide, or the like. In some embodiments, the first insulating layer 130 and the second insulating layer 150 may include the same material. In some other embodiments, the first insulating layer 130 and the second insulating layer 150 may include different materials. It should be noted that the first insulating layer 130 is between the reflecting mirror 110 and the thermistor 140, which allows the first insulating layer 130 to absorb the infrared light reflected by the reflecting mirror 110 and transmit the energy to the thermistor 140.

The electrode layer 160 is in the second insulating layer 150 and right above the thermistor 140. As shown in FIG. 3B, the first portion 152 of the second insulating layer 150 separates the electrode layer 160 and the thermistor 140, so that the electrode layer 160 may not physically contact the thermistor 140. The electrode layer 160 is electrically connected to the thermistor 140 to transmit the current to the thermistor 140. As a result, the current signal from the thermistor 140 may be transmitted to other element, such as the read-out integrated circuit in the substrate 100, of the bolometer 10 by the electrode layer 160.

The electrode layer 160 includes a plurality of electrodes separated from each other. As shown in FIG. 3B, the second insulating layer 150 penetrates through the electrode layer 160, so that the second insulating layer 150 fills the gaps between the electrodes of the electrode layer 160. In other words, an area of the electrode layer 160 is smaller than that of the thermistor 140 in the top view. The electrodes of the electrode layer 160 are uniformly distributed in the second insulating layer 150, which reduces the deformation of the temperature sensing unit 120 and improves the structural balance of the temperature sensing unit 120. It should be noted that the electrodes separated from each other in the electrode layer 160 may lower the infrared reflection of the electrode layer 160. Therefore, the impact on the infrared absorption of the underlying thermistor 140 by the electrode layer 160 may be reduced, which improves the accuracy of the bolometer 10. The electrode layer 160 will be further discussed in detail in the following content (for example, referring to FIG. 6A and FIG. 6B).

The metal meta-surface 170 is in the second insulating layer 150 and right above the electrode layer 160. In other words, the metal meta-surface 170 is also right above the thermistor 140. As shown in FIG. 3B, the second portion 154 of the second insulating layer 150 separates the electrode layer 160 from the metal meta-surface 170, so that the electrode layer 160 may not physically contact the metal meta-surface 170. The third portion 156 of the second insulating layer 150 covers the metal meta-surface 170 to protect the metal meta-surface 170 and the underlying elements. In some embodiments, the metal meta-surface 170 and the electrode layer 160 may be electrically isolated by the second portion 154 of the second insulating layer 150.

The metal meta-surface 170 includes a plurality of meta-atom unit cells, or may be referred as meta-atoms. The meta-atom unit cells may provide localized surface plasma effect, which provides the high absorbance of the metal meta-surface 170 at specific wavelength. As the metal meta-surface 170 has high infrared absorbance, the infrared energy absorbed by the metal meta-surface 170 may be further transmitted to the thermistor 140 to change the resistance of the thermistor 140. In some embodiments, a projection region of the metal meta-surface 170 on the thermistor 140 may be equal to or larger than the thermistor 140, so that the energy absorbed by the metal meta-surface 170 may be uniformly transmitted to the entire thermistor 140.

Since the metal meta-surface 170 has high infrared absorbance, the metal meta-surface 170 may increase the infrared absorption efficiency of the temperature sensing unit 120 and thus increase the accuracy of the bolometer 10. In addition, the metal meta-surface 170 may broaden the infrared response bandwidth of the temperature sensing unit 120. As a result, the infrared light in a specific wavelength range may easily raise the temperature of the thermistor 140, which increases the sensitivity of the bolometer 10.

In some embodiments, the meta-atom unit cells of the metal meta-surface 170 may form a two-dimensional array to provide the high absorbance of the metal meta-surface 170 at specific wavelength. For example, the metal meta-surface 170 may have high absorbance at the strongest wavelength emitted by human body (for example, the wavelength between about 8 micrometer and about 14 micrometer), so that the bolometer 10 is suitable for taking the body temperature. In some preferred embodiments, the metal meta-surface 170 may show high absorbance of the infrared light at the peak value between about 9 micrometer and about 10 micrometer. For example, the peak value may be about 9.5 micrometer.

According to some embodiments of the present disclosure, FIGS. 4A to 4H illustrate the top views of the metal meta-surfaces which may be used as the metal meta-surface 170 in FIGS. 3A to 3C. FIGS. 4A to 4H respectively illustrate the metal meta-surfaces having different type of meta-atom unit cells. The meta-atom unit cells illustrated in FIGS. 4A to 4H may provide the high absorbance of the metal meta-surface at specific wavelength, such as the wavelength between about 9 micrometer and about 10 micrometer, thereby increasing the accuracy of the bolometer 10.

In some embodiments, the meta-atom unit cells of the metal meta-surface may be arranged as a tetragonal crystal lattice. For example, FIGS. 4A to 4D illustrate the meta-atom unit cells having different shapes, and the meta-atom unit cells of each figure are arranged as the tetragonal crystal lattice. In some other embodiments, the meta-atom unit cells of the metal meta-surface may be arranged as a triangular crystal lattice, or called as a hexagonal crystal lattice in some cases. As the meta-atom unit cells are uniformly distributed in the second insulating layer in the above-mentioned manner, the metal meta-surface may show high infrared absorbance and uniformly transmit the absorbed infrared energy to the underlying thermistor. In addition, the meta-atom unit cells in some embodiments may have different sizes alternately arranged in the metal meta-surface, as shown in FIG. 4G and FIG. 4H.

Figure 4A:
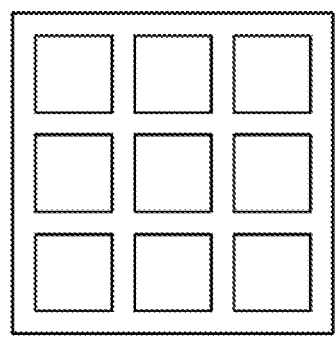
FIGS. 4A to 4H illustrate top views of the metal meta-surfaces according to some embodiments of the present disclosure.
Figure 4B:
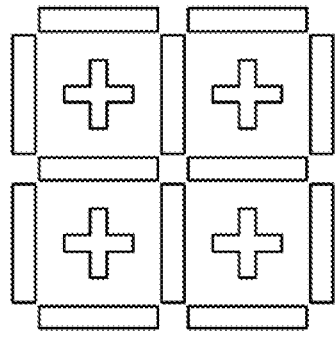
Figure 4C:
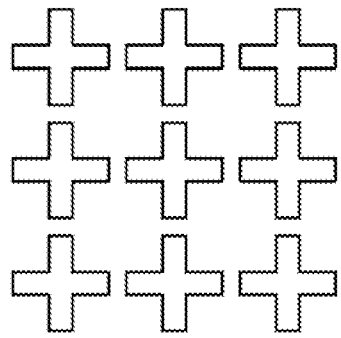
Figure 4D:
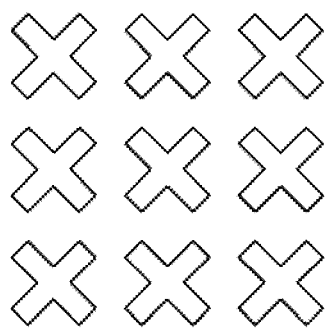
Figure 4E:
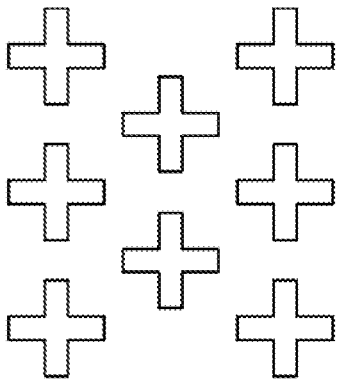
Figure 4F:
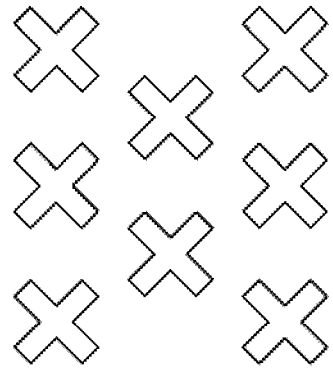
Figure 4G:
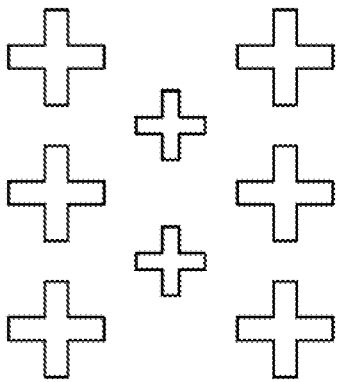
Figure 4H:
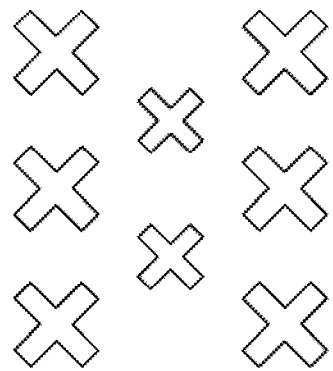

In some embodiments, the meta-atom unit cells of the metal meta-surface may include cross-shaped unit cells, as shown in FIG. 4A, FIG. 4B, FIG. 4C, FIG. 4E, and FIG. 4G. The unit cells in FIG. 4A are connected multiple unit cells, and the multiple unit cells illustrated in FIG. 4B, FIG. 4C, FIG. 4E, and FIG. 4G are separated from each other. In some other embodiments, the meta-atom unit cells of the metal meta-surface may include X-shaped unit cells, as shown in FIG. 4D, FIG. 4F, and FIG. 4H.

Specifically, the meta-atom unit cells may be formed as cross-shaped or X-shaped unit cells by adjusting the width and the period of the meta-atom unit cells. As the meta-atom unit cells have the above shapes, the metal meta-surface may show high absorbance at specific wavelength, such as the wavelength between about 9 micrometer and about 10 micrometer. For example, when the width of the meta-atom unit cells is about 0.05 micrometer to about 0.35 micrometer, and the period of the meta-atom unit cells is about 2 micrometer to about 3 micrometer, the meta-atom unit cells may be formed as the cross-shaped unit cells shown in FIG. 4A. In some cases, the meta-atom unit cells in FIG. 4A may be called as window-shaped unit cells. If the period of the meta-atom unit cells is smaller than 2 micrometer or larger than 3 micrometer, the peak value and the bandwidth of infrared absorption of the metal meta-surface may significantly change, leading to the deviation of the absorption wavelength of the metal meta-surface.

In some embodiments, a ratio of the width of the meta-atom unit cells to the period of the meta-atom unit cells (i.e., width/period) may be defined as a duty cycle. The duty cycle is one processing parameter for adjusting the shape of the meta-atom unit cells. Specifically, the duty cycle of the metal meta-surface may be between 1.5% and 35%, so that the metal meta-surface shows high absorbance at the wavelength between about 9 micrometer and about 10 micrometer. For example, as the duty cycle of the metal meta-surface is between 1.5% and 20%, the meta-atom unit cells may be formed as the cross-shaped unit cells shown in FIG. 4A and provide high absorbance of the metal meta-surface at the wavelength about 9.5 micrometer.

Referring back to FIGS. 3A to 3C, the metal meta-surface 170 may have a suitable thickness to increase the absorbance of the bolometer 10 at specific wavelength. In some embodiments, the thickness of the metal meta-surface 170 may be between 5 nm and 20 nm, so that the metal meta-surface 170 shows high absorbance at the wavelength between about 9 micrometer and about 10 micrometer. If the thickness of the metal meta-surface 170 is smaller than 5 nm, the infrared absorbance of the metal meta-surface 170 may not significantly increase the infrared absorption efficiency of the temperature sensing unit 120. If the thickness of the metal meta-surface 170 is larger than 20 nm, the peak value and the bandwidth of infrared absorption of the metal meta-surface 170 may deviate from the expected wavelength.

Figure 5:
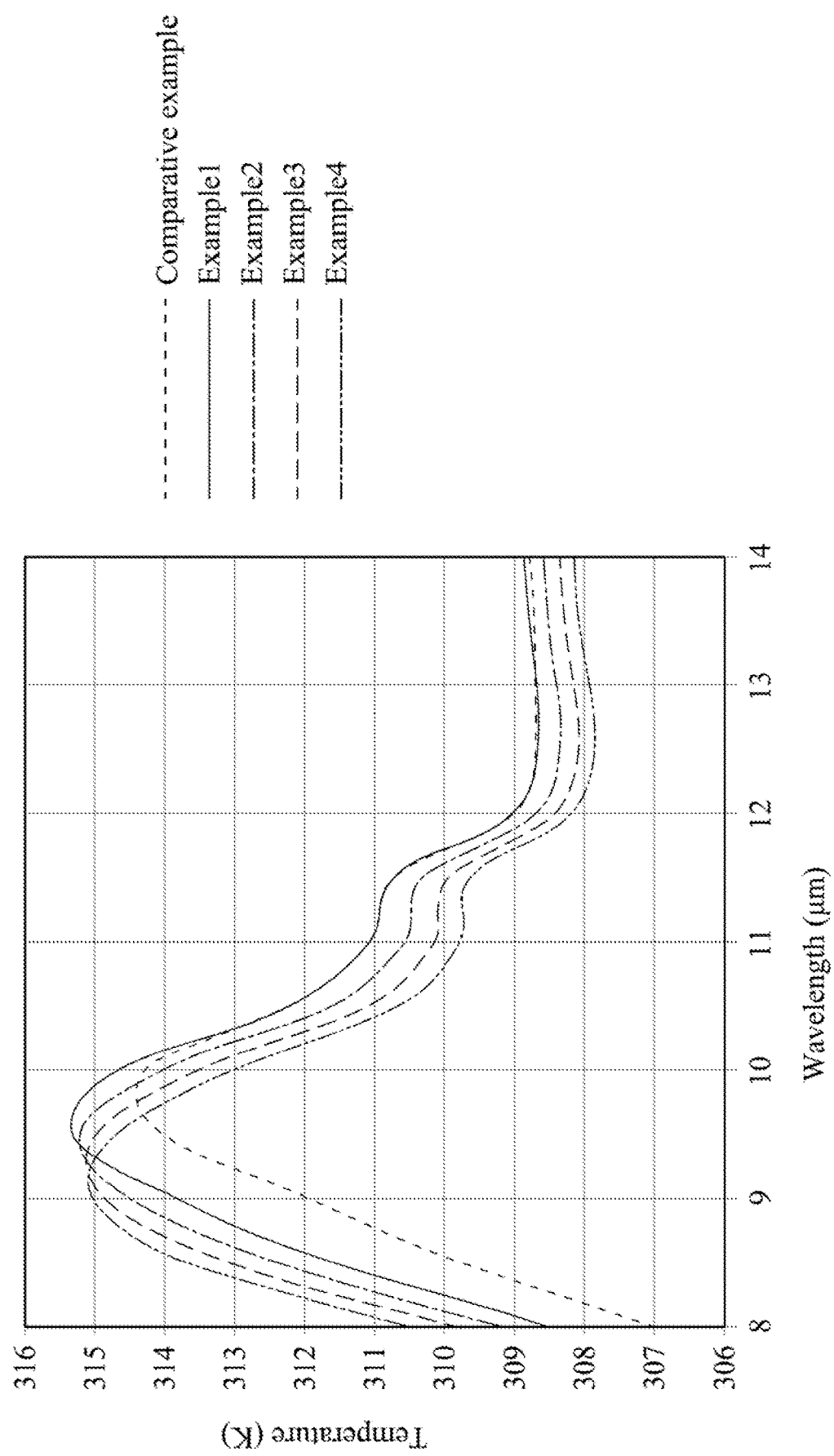
FIG. 5 illustrates a diagram of temperature measured by the temperature sensing unit versus wavelength of the infrared light according to some embodiments of the present disclosure.

FIG. 5 illustrates a diagram of temperature measured by various temperature sensing units versus wavelength of the infrared light. The temperature sensing units used for measurement are similar to the temperature sensing unit 120 shown in FIG. 3A to FIG. 3C. The results in FIG. 5 include Comparative example and Examples 1 to 4. The temperature sensing unit of Comparative example does not include the metal meta-surface, and the temperature sensing units of Examples 1 to 4 respectively include the metal meta-surface with the thickness of 5 nm, 10 nm, 15 nm, and 20 nm.

As shown in FIG. 5, the temperature-wavelength line graphs are compared according to the results measured by the temperature sensing units. The temperature peak values measured by Examples 1 to 4 are higher than that of Comparative example, which indicates the temperature sensing unit including the metal meta-surface has higher infrared absorbance. For the infrared light having the wavelength about 8 micrometer to about 10 micrometer, the temperatures measured by Examples 1 to 4 are obviously higher than that of Comparative example, which indicates the temperature sensing unit including the metal meta-surface has higher infrared absorbance at wavelength about 8 micrometer to about 10 micrometer. In addition, the areas below the temperature lines of Examples 1 to 4 are larger than that of Comparative example at wavelength between about 8 micrometer and about 10 micrometer. This indicates that the temperature sensing unit including the metal meta-surface has larger response bandwidth at wavelength between about 8 micrometer and about 10 micrometer.

It should be noted that the wavelength corresponding to the peak value of the temperature line may become smaller as the thickness of the metal meta-surface increases. Taking Examples 1 to 4 as an example, when the thickness of the metal meta-surface is 5 nm, the wavelength corresponding to the peak value of the temperature line may be about 9.5 micrometer; when the thickness of the metal meta-surface increases to 20 nm, the wavelength corresponding to the peak value of the temperature line may left shift to about 9 micrometer. According to the Examples shown in FIG. 5, the thickness of the metal meta-surface may affect the infrared absorbance and absorption bandwidth of the temperature sensing unit.

The metal meta-surface 170 shown in FIGS. 3A to 3C may include suitable materials to increase the absorbance of the bolometer 10 at specific wavelength. In addition, the material of the metal meta-surface 170 may have low heat capacity. Therefore, the metal meta-surface 170 may transmit most absorbed infrared energy to the thermistor 140. This reduces the impact on the accuracy of the bolometer 10 by the metal meta-surface 170. In some embodiments, the meta-atom unit cells of the metal meta-surface 170 may include chromium, so that metal meta-surface 170 has high infrared absorbance at wavelength between about 8 micrometer and about 14 micrometer. In some preferred embodiments, the meta-atom unit cells of the metal meta-surface 170 may include titanium, titanium nitride, or combinations thereof, so that the metal meta-surface 170 has high infrared absorbance at wavelength between about 9 micrometer and about 10 micrometer. In some embodiments, the metal meta-surface 170 and the electrode layer 160 may include the same material. For example, the metal meta-surface 170 and the electrode layer 160 may both be formed of titanium, titanium nitride, the like, or combinations thereof.

Figure 6B:
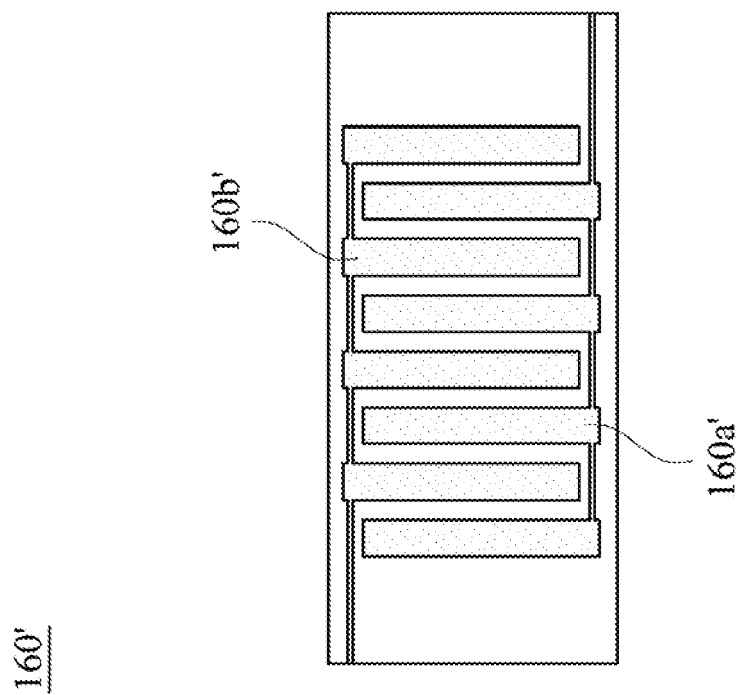
FIGS. 6A to 6B illustrate top views of the electrode layer according to some embodiments of the present disclosure.
Figure 6A:
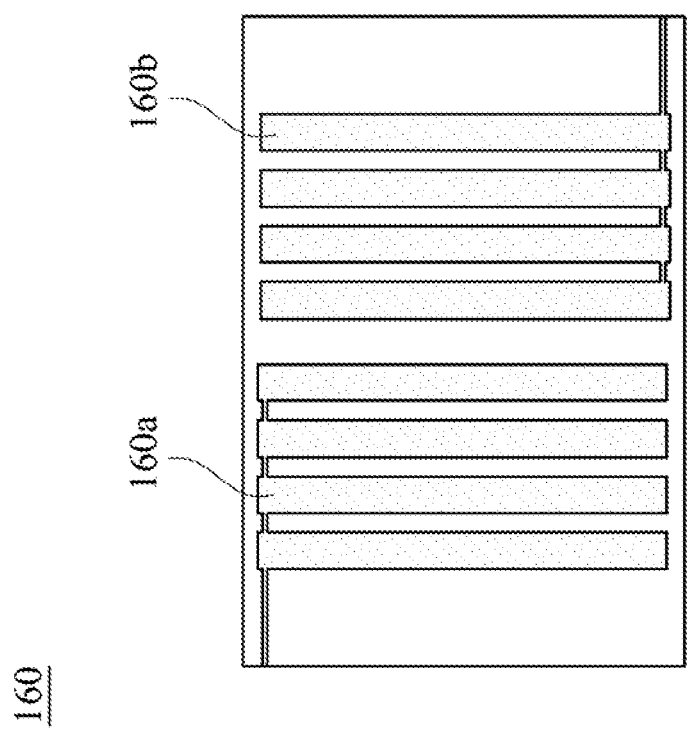

As mentioned above, a plurality of electrodes of the electrode layer 160 are uniformly distributed in the second insulating layer 150, thereby reducing the deformation of the temperature sensing unit 120. In addition, the electrodes of the electrode layer 160 may increase the surface area of the electrode layer 160, thereby reducing the contact resistance of the electrode layer 160. According to some embodiments of the present disclosure, FIGS. 6A to 6B illustrate top views of the electrode layer 160 and the electrode layer 160'. The electrode layer 160 in FIG. 6A and the electrode layer 160' in FIG. 6B may be used in the temperature sensing unit 120 shown in FIG. 1. The electrode layer 160 and the electrode layer 160' are merely examples, and the electrode layer with other shape or arrangement may be used in the temperature sensing unit 120 in other embodiments.

In some embodiments, as shown in FIG. 6A, the electrode layer 160 may include a first electrode group 160a and a second electrode group 160b. Each of the first electrode group 160a and the second electrode group 160b includes a plurality of electrodes. The electrodes of the first electrode group 160a are separated from each other. The electrodes of the second electrode group 160b are also separated from each other. The first electrode group 160a is adjacent to the second electrode group 160b, and the electrodes of the first electrode group 160a and the electrodes of the second electrode group 160b are separated. In some cases, the electrode layer 160 shown in FIG. 6A may be called as a grating electrode layer.

In some embodiments, as shown in FIG. 6B, the electrode layer 160' may include a first electrode group 160a' and a second electrode group 160b'. Each of the first electrode group 160a' and the second electrode group 160b' includes a plurality of electrodes, and the electrodes of the first electrode group 160a' and the electrodes of the second electrode group 160b' are alternately arranged. The alternately arranged electrodes are separated from each other, thereby further reducing the contact resistance of the electrode layer 160'. In some cases, the electrode layer 160 shown in FIG. 6B may be called as an interdigitated electrode layer.

In the embodiments illustrated in FIG. 6A and FIG. 6B, the longitudinal axis direction of the electrodes of the electrode layer 160 and the electrode layer 160' are along with the current direction. In some other embodiments, the longitudinal axis direction of the electrodes of the electrode layer 160 and the electrode layer 160' may be vertical to the current direction. In some embodiments, the width of the electrodes of the electrode layer 160 and the electrode layer 160' may be between about 1 micrometer and about 3 micrometer, while the gap between the electrodes may be between about 1 micrometer and about 5 micrometer. This provides the electrode layer 160 and the electrode layer 160' with low contact resistance.

Referring back to FIG. 1, the bolometer 10 may include other supporting elements to place the temperature sensing unit 120 above the reflecting mirror 110. In some embodiments, the supporting elements of the bolometer 10 may include supporting pillars 115 and supporting arms 180. The supporting pillars 115 are disposed on the substrate 100 and between the temperature sensing unit 120 and the reflecting mirror 110. The supporting arms 180 connect the temperature sensing unit 120 and the supporting pillar 115, so that the temperature sensing unit 120 may be fixed on one end of the supporting pillar 115 by the supporting arm 180 to be separated from the reflecting mirror 110. As shown in FIG. 1, the supporting arms 180 may have an L-shaped structure, while a pair of the supporting arms 180 surrounds the temperature sensing unit 120.

The supporting pillars 115 and the supporting arms 180 may separate the temperature sensing unit 120 from the reflecting mirror 110, so that the temperature sensing unit 120 is suspended above the reflecting mirror 110 to be physically isolated from the reflecting mirror 110. Therefore, the bolometer 10 may be called as a suspended bolometer in some cases. In some embodiments, the gap between the reflecting mirror 110 and the temperature sensing unit 120 may be filled with air as a heat insulator, thereby reducing the influence to other elements in the bolometer 10 by the raised temperature of the temperature sensing unit 120.

In some embodiments, the bolometer 10 may include a conductive anchor 190 on the supporting pillar 115. The conductive anchor 190 is electrically connected to the electrode layer 160 and the thermistor 140 to transmit the current signal from the thermistor 140 to other elements, such as the read-out integrated circuit in the substrate 100, in the bolometer 10 by the electrode layer 160 and the conductive anchor 190.

According to one embodiment of the present disclosure, FIGS. 7A to 7G illustrate the perspective views and top views of intermediate stages of manufacturing the temperature sensing unit applied in the bolometer. For example, the temperature sensing unit 120 in the bolometer 10 shown in FIG. 3A to FIG. 3C may be manufactured by the processing steps illustrated in FIG. 7A to FIG. 7G. Specifically, the manufacturing steps of the temperature sensing unit include forming a thermistor on a first insulating layer, forming a second insulating layer on the thermistor, forming an electrode layer in the second insulating layer, and forming a metal meta-surface in the second insulating layer. These steps will be further discussed in the following content. It should be noted that additional operations can be provided before, during, and/or after the operations in FIG. 7A to FIG. 7G, and some operations can be replace, eliminated, or performed in alternative logical order.

Figure 7A:
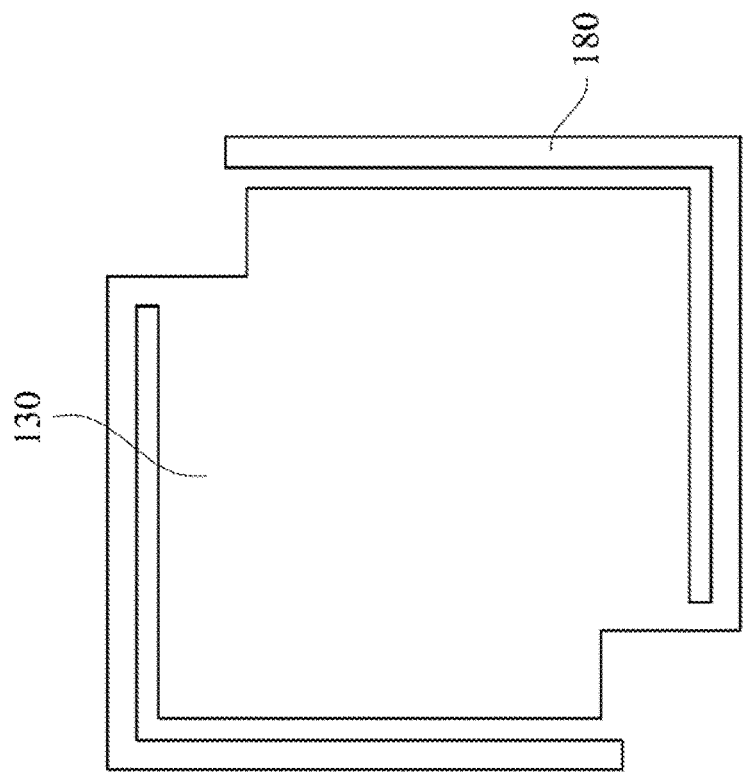
FIGS. 7A to 7G illustrate perspective views and top views of intermediate stages of manufacturing the temperature sensing unit of the bolometer according to one embodiment of the present disclosure.
Figure 7A:
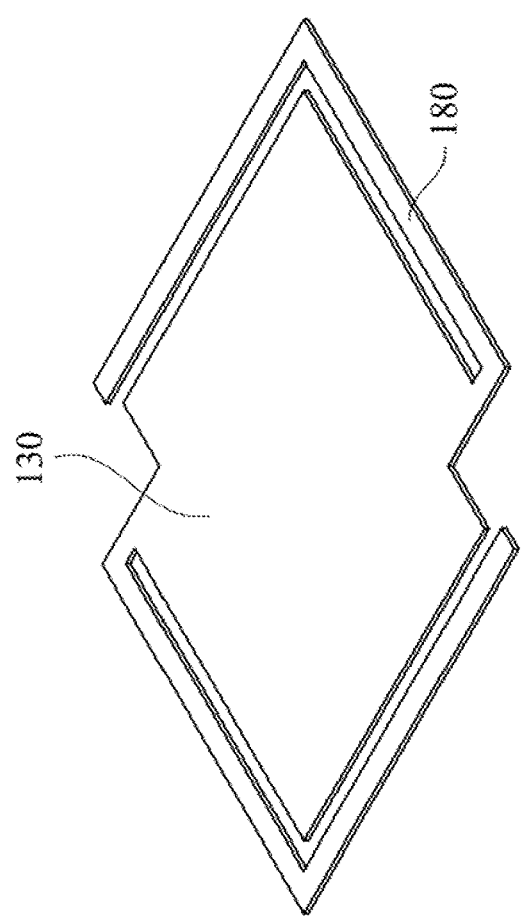

Referring to FIG. 7A, a first insulating layer 130 is formed. In some embodiments, the insulating material of the first insulating layer 130 may first be formed on a carrier substrate (not shown) by a deposition process, and then be patterned to the shape for the temperature sensing unit by a patterning process to form the first insulating layer 130. After the patterning process, the patterned material layer may further include supporting arms 180, so that the first insulating layer 130 and the supporting arm 180 are integrally formed into one piece. Therefore, the resulted temperature sensing unit may be firmly connected to the supporting arms 180.

Figure 7B:
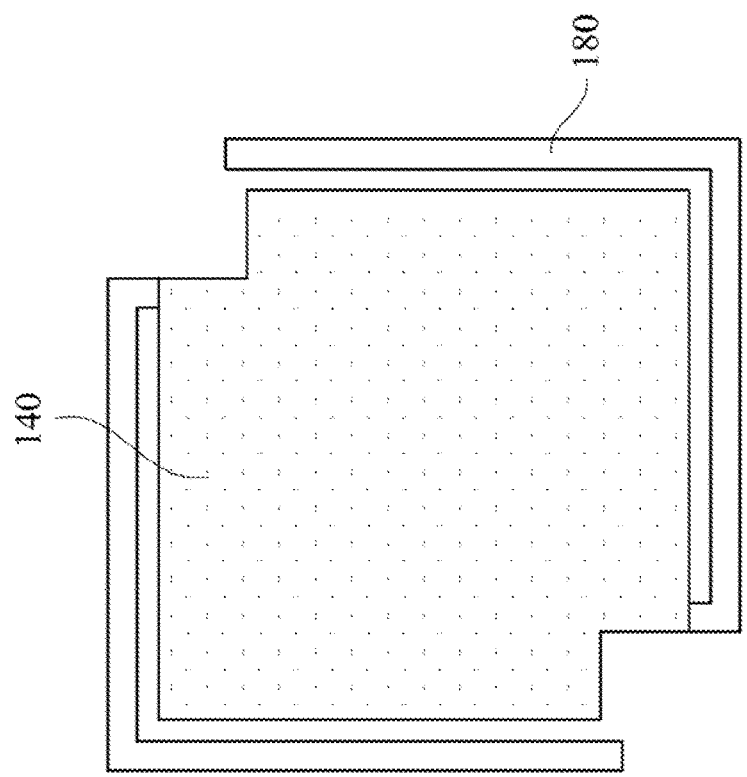
Figure 7B:
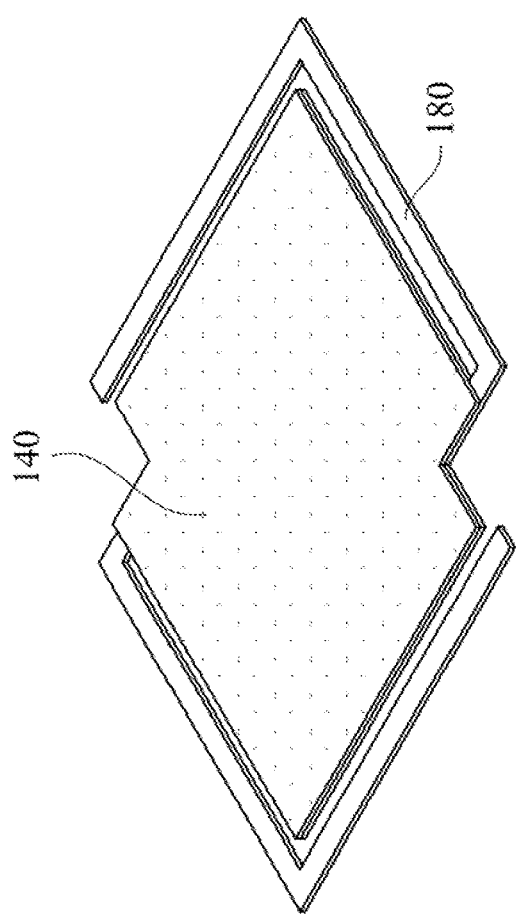

Referring to FIG. 7B, a thermistor 140 is formed on the first insulating layer 130 to cover the first insulating layer 130. In some embodiments, the thermistor 140 may be formed on the first insulating layer 130 by a vapor deposition process, such as physical vapor deposition (PVD), chemical vapor deposition (CVD), or the like. In some embodiments, the thermistor 140 may be formed on the first insulating layer 130 but not on the supporting arms 180, leading to the thermistor 140 assembled in the sensing region of the temperature sensing unit.

Figure 7C:
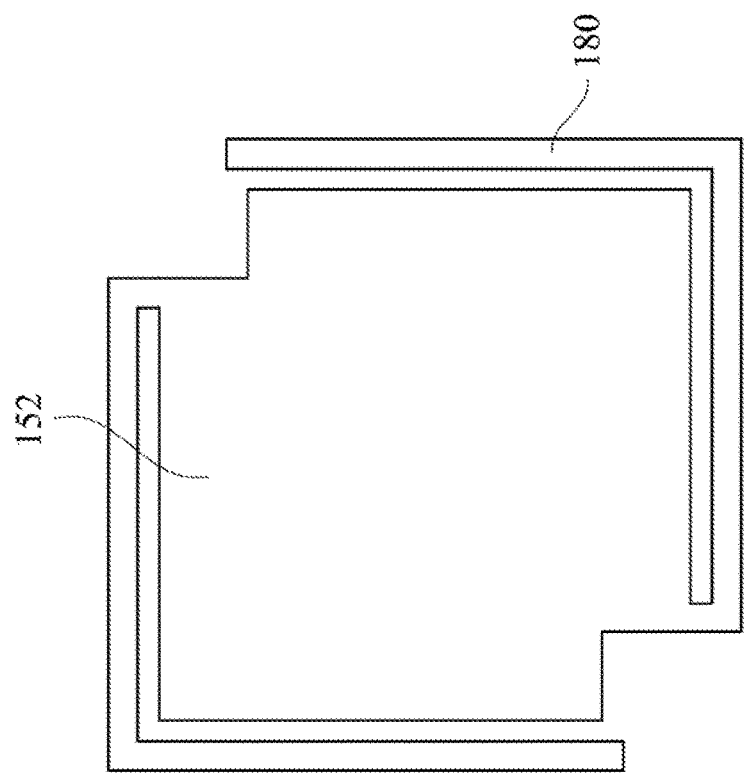
Figure 7C:
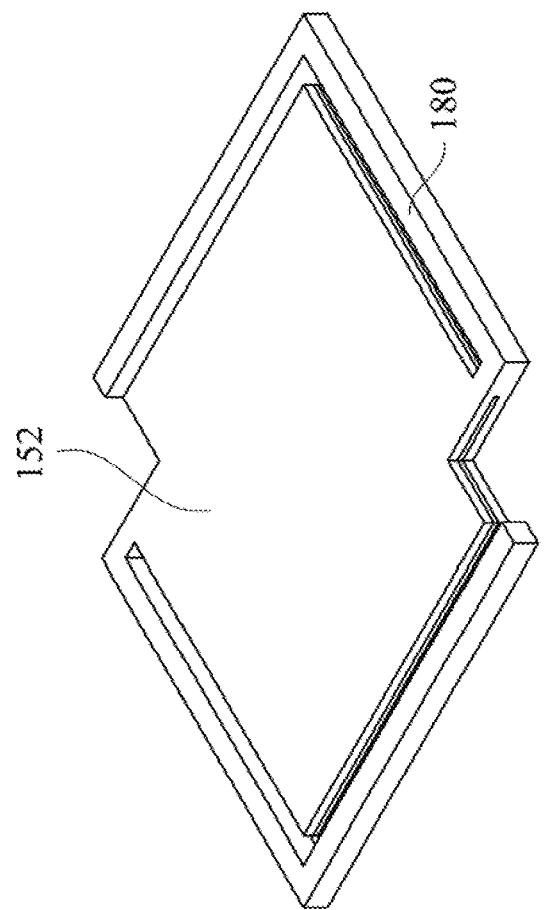

Referring to FIG. 7C, a first portion 152 of a second insulating layer is formed on the thermistor 140 to cover the thermistor 140. In some embodiments, the insulating material of the second insulating layer (referring to the second insulating layer 150 in FIG. 3B) may be deposited on the thermistor 140 by the step similar to that of FIG. 7A, so that the shape of the first portion 152 corresponds to the underlying thermistor 140 and first insulating layer 130. In some embodiments, the material of the second insulating layer may be formed on the supporting arms 180, leading to the first portion 152 and the supporting arms 180 integrally formed into one piece. After the operation shown in FIG. 7C, the upper surface of the first portion 152 may be levelled with the upper surface of the supporting arm 180.

Figure 7D:
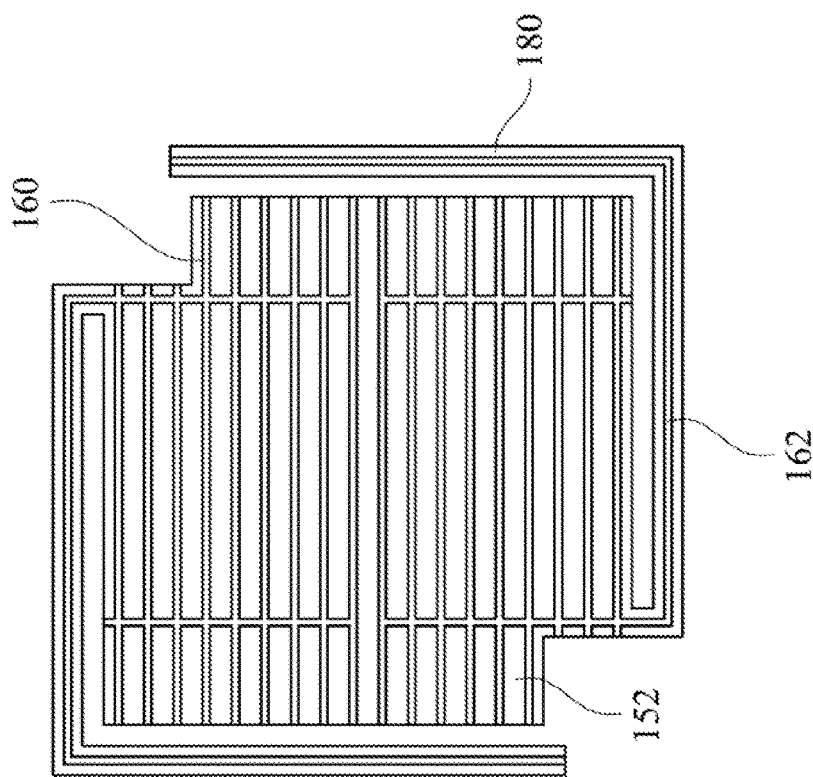
Figure 7D:
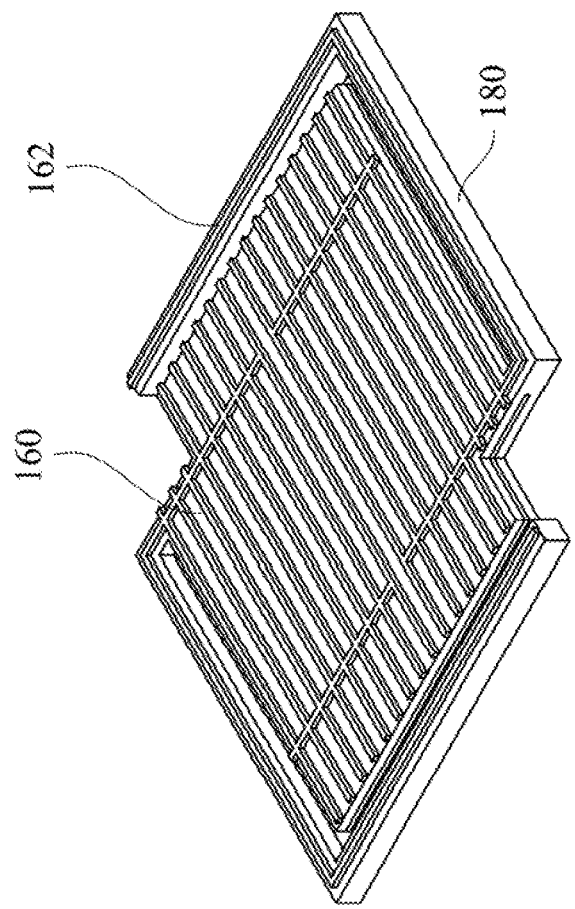

Referring to FIG. 7D, an electrode layer 160 is formed on the first portion 152 and right above the thermistor 140. The electrode layer 160 on the first portion 152 includes a plurality of electrodes with gaps among the electrodes. As a result, the first portion 152 is exposed between the electrodes of the electrode layer 160. In some embodiments, the material of the electrode layer 160 may first be formed on the first portion 152 by a deposition process, and then be patterned into the multiple electrodes of the electrode layer 160 by a patterning process. In some other embodiments, the multiple electrodes of the electrode layer 160 may be formed by a plating process. In some embodiments, an extended portion 162 of the electrode layer 160 may be formed on the supporting arms 180, so that the electrode layer 160 may be electrically connected to other elements by the extended portion 162. For example, the extend portion 162 of the electrode layer 160 may be electrically connected to the thermistor 140 and the read-out circuit element in the bolometer to transmit the current signal of the thermistor 140 to the read-out circuit element.

Figure 7E:
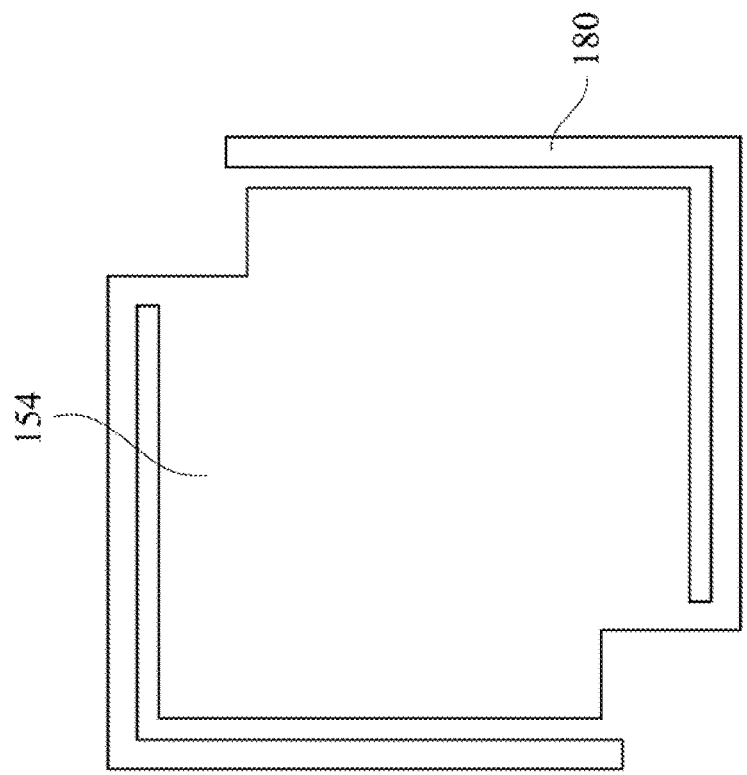
Figure 7E:
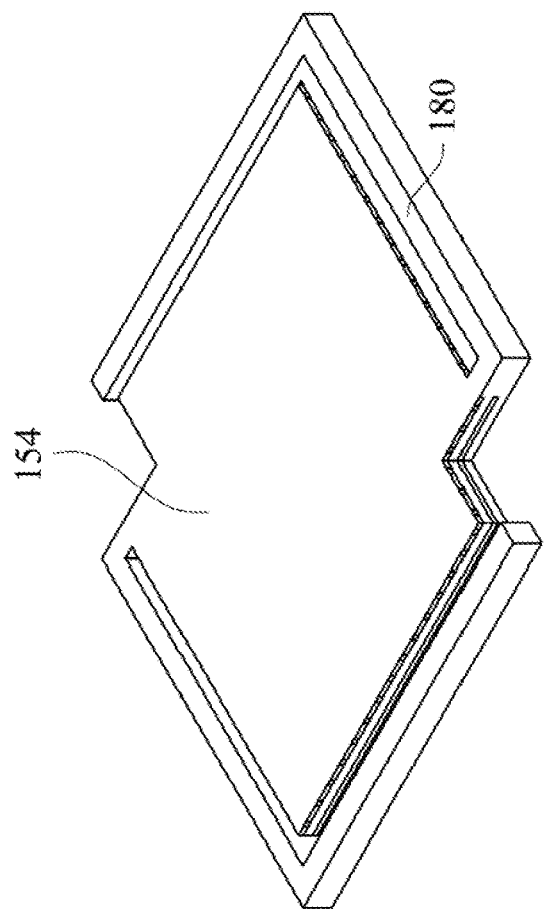

Referring to FIG. 7E, a second portion 154 of the second insulating layer is formed on the electrode layer 160 to cover the electrode layer 160 and the first portion 152. In some embodiments, the insulating material of the second insulating layer may be deposited on the electrode layer 160 by the step similar to that of FIG. 7A, so that the shape of the second portion 154 corresponds to the underlying first portion 152. In some embodiments, the material of the second insulating layer may be formed on the supporting arms 180, leading to the second portion 154 and the supporting arms 180 integrally formed into one piece. After the operation shown in FIG. 7E, the upper surface of the second portion 154 may be levelled with the upper surface of the supporting arm 180. In the embodiments which the electrode layer 160 includes the extend portion 162, the second portion 154 may cover and protect the extend portion 162 on the supporting arms 180.

Figure 7F:
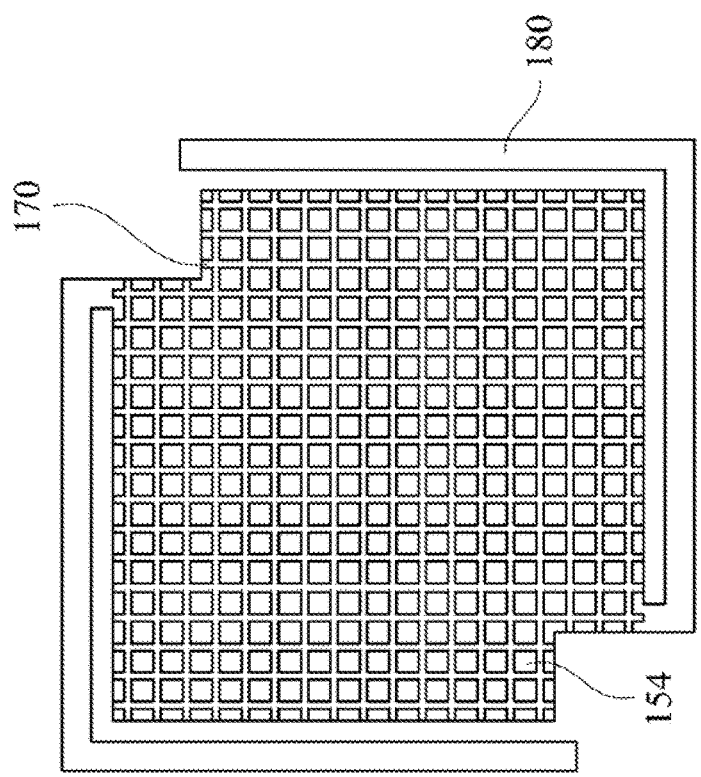
Figure 7F:
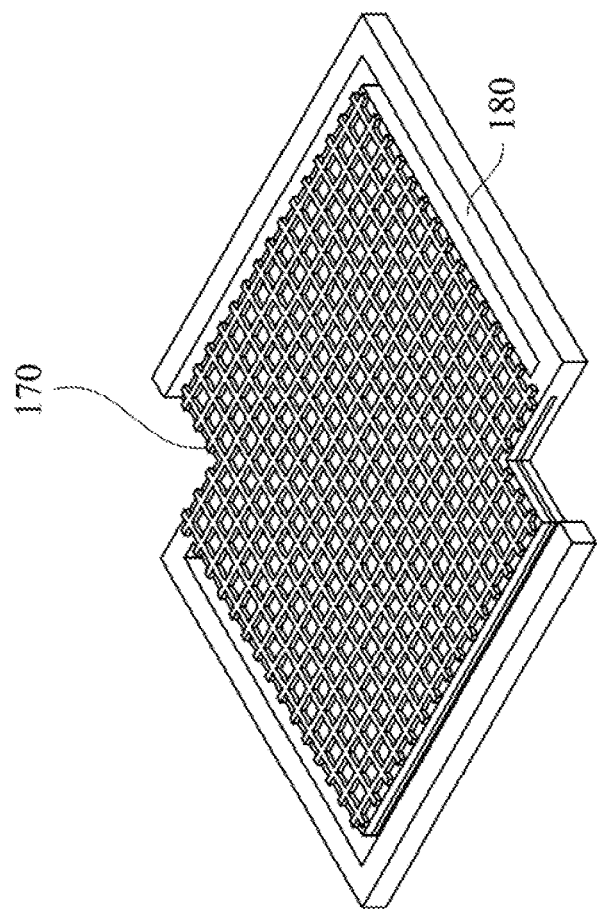

Referring to FIG. 7F, a metal meta-surface 170 is formed on the second portion 154 and right above the thermistor 140 and the electrode layer 160. The metal meta-surface 170 includes a plurality of meta-atom unit cells. The meta-atom unit cells do not cover the entire second portion 154, so that the second portion 154 is exposed between the meta-atom unit cells. In some embodiments, the meta-atom unit cells of the metal meta-surface 170 may be formed by a deposition process or plating process. In some embodiments, a duty cycle for forming the meta-atom unit cells may be between 1.5% and 35%, so that metal meta-surface 170 has high absorbance at specific wavelength. In some embodiments, the metal meta-surface 170 may be formed on the second portion 154 but not on the supporting arms 180, leading to the metal meta-surface 170 assembled in the sensing region of the temperature sensing unit.

Figure 7G:
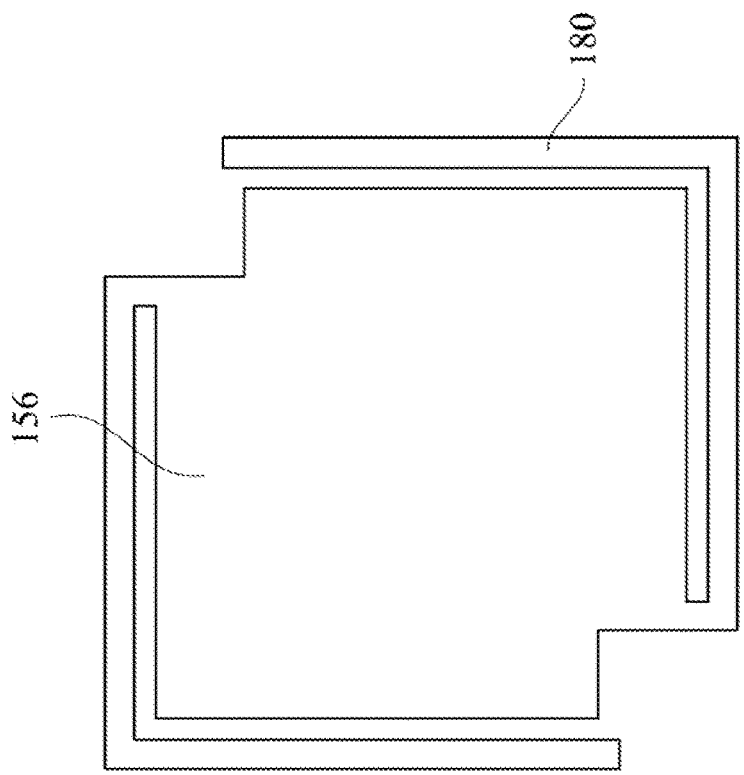
Figure 7G:
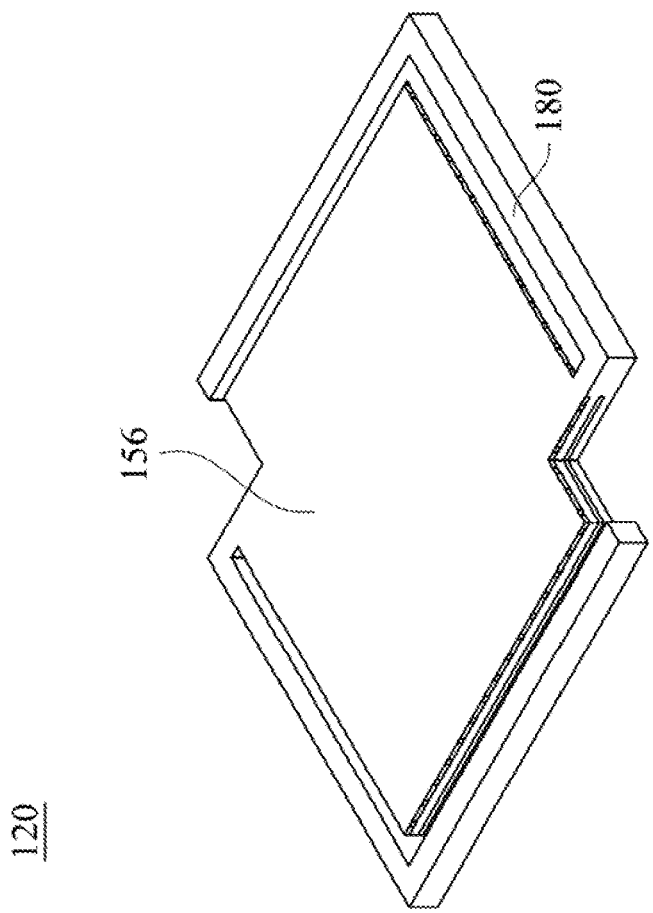

Referring to FIG. 7G, a third portion 156 of the second insulating layer is formed on the metal meta-surface 170 to cover the metal meta-surface 170 and the second portion 154. In some embodiments, the insulating material of the second insulating layer may be deposited on the metal meta-surface 170 by the step similar to that of FIG. 7A, so that the shape of the third portion 156 corresponds to the underlying second portion 154. In some embodiments, the material of the second insulating layer may be formed on the supporting arms 180, leading to the third portion 156 and the supporting arms 180 integrally formed into one piece. After the operation shown in FIG. 7G, the upper surface of the third portion 156 may be levelled with the upper surface of the supporting arm 180.

The above-mentioned operations may directly form the metal meta-surface in the insulating layer and right above the thermistor, thereby simplifying the process of the temperature sensing unit. In some embodiments, a combination of the first portion of the second insulating layer and the thermistor, a combination of the second portion of the second insulating layer and the electrode layer, or a combination of the third portion the second insulating layer and the metal meta-surface may be formed in the same cavity. Alternatively, the carrier substrate with the first formed material layer may be delivered to the next cavity for the later formed material layer in vacuum. Therefore, the risk of oxidation of the thermistor, the electrode layer, or the metal meta-surface and the damage on these materials may be reduced.

According to the above-mentioned embodiments of the present disclosure, the temperature sensing unit of the bolometer includes the first insulating layer, the thermistor of the first insulating layer, the second insulating layer on the thermistor, and the electrode layer and the metal meta-surface in the second insulating layer. The metal meta-surface right above the thermistor may increase the infrared absorption efficiency of the temperature sensing unit. Therefore, the thermistor can easily absorb the energy at the specific wavelength and improve the sensitivity and accuracy of the temperature sensing unit. In addition, the gaps between the electrodes in the electrode layer may reduce the deformation of the temperature sensing unit and reduce the impact on the infrared light absorption from above the electrode layer.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A bolometer, comprising:
 a substrate;
 a reflecting mirror on the substrate; and
 a temperature sensing unit above the reflecting mirror, wherein the temperature sensing unit comprises:
   a first insulating layer;
   a thermistor on the first insulating layer;
   a second insulating layer on the thermistor;
   an electrode layer in the second insulating layer and right above the thermistor, wherein the electrode layer comprises a plurality of electrodes separated from each other; and
   a metal meta-surface in the second insulating layer and right above the electrode layer, wherein a projection region of the metal meta-surface on the thermistor is equal to or larger than the thermistor.

2. The bolometer of claim 1, wherein a thickness of the metal meta-surface is between 5 nm and 20 nm.

3. The bolometer of claim 1, wherein meta-atom unit cells of the metal meta-surface comprises cross-shaped unit cells or X-shaped unit cells.

4. The bolometer of claim 1, wherein meta-atom unit cells of the metal meta-surface are arranged as a triangular crystal lattice or a tetragonal crystal lattice.

5. The bolometer of claim 1, wherein the metal meta-surface is physically and electrically isolated from the electrode layer by the second insulating layer.

6. The bolometer of claim 1, wherein the electrodes of the electrode layer comprise a first electrode group and a second electrode group, the first electrode group is adjacent to the second electrode group, and a plurality of first electrodes of the first electrode group is separated from a plurality of second electrodes of the second electrode group.

7. The bolometer of claim 1, wherein the electrodes of the electrode layer comprise a first electrode group and a second electrode group, a plurality of first electrodes of the first electrode group and a plurality of second electrodes of the second electrode group are alternately arranged, and the first electrodes are separated from the second electrodes.

8. The bolometer of claim 1, wherein the second insulating layer fills gaps between the electrodes of the electrode layer.

9. The bolometer of claim 1, wherein the temperature sensing unit is physically isolated from the reflecting mirror.

10. The bolometer of claim 1, further comprising a plurality of supporting pillars on the substrate, wherein the supporting pillars separate the temperature sensing unit from the reflecting mirror.

11. The bolometer of claim 10, further comprising a plurality of supporting arms connecting the temperature sensing unit and the supporting pillars.

12. The bolometer of claim 11, wherein the electrode layer is electrically connected to the thermistor by conductive anchors on the supporting arms.

13. The bolometer of claim 1, wherein a gap filled with air is between the temperature sensing unit and the reflecting mirror.

14. The bolometer of claim 1, wherein the reflecting mirror comprises a multilayer structure formed of titanium, titanium nitride, or aluminum.

15. A manufacturing method of a temperature sensing unit, comprising:
    forming a thermistor on a first insulating layer;
    forming a first portion of a second insulating layer on the thermistor, wherein the first portion covers the thermistor;
    forming an electrode layer on the first portion, wherein the electrode layer is right above the thermistor, the first portion is exposed between a plurality of electrodes of the electrode layer;
    forming a second portion of the second insulating layer on the electrode layer, wherein the second portion covers the electrode layer and the first portion;
    forming a metal meta-surface on the second portion, wherein the metal meta-surface is right above the thermistor; and
    forming a third portion of the second insulating layer on the metal meta-surface, wherein the third portion covers the metal meta-surface and the second portion.

16. The method of claim 15, wherein forming the metal meta-surface comprises forming a plurality of meta-atom unit cells of the metal meta-surface by a duty cycle between 1.5% and 35%.

17. The method of claim 15, further comprising:
    depositing an insulating material of the first insulating layer; and
    performing a patterning process on the insulating material to form the first insulating layer and a supporting arm connected to the first insulating layer.

18. The method of claim 17, wherein forming the electrode layer on the first portion further comprises:
    forming an extended portion of the electrode layer on the supporting arm, wherein the extended portion is electrically connected to the thermistor.

19. The method of claim 15, wherein after forming the metal meta-surface on the second portion, the second portion is exposed between a plurality of meta-atom unit cells of the metal meta-surface.

20. The method of claim 15, wherein forming the metal meta-surface on the second portion and forming the third portion of the second insulating layer on the metal meta-surface are performed in a same cavity.

* * * * *